United States Patent [19]

Steinmetz

[11] Patent Number: 5,905,779
[45] Date of Patent: May 18, 1999

[54] AUTOMATIC DIAL-UP SOFTWARE UPDATE SYSTEM

[75] Inventor: James D. Steinmetz, Orland Park, Ill.

[73] Assignee: Rockwell Science Center, Thousand Oaks, Calif.

[21] Appl. No.: 09/111,820

[22] Filed: Jul. 8, 1998

Related U.S. Application Data

[63] Continuation-in-part of application No. 08/611,394, Mar. 6, 1996, abandoned.

[51] Int. Cl.$^6$ .............................. H04M 11/00; H04M 3/42
[52] U.S. Cl. ........................ 379/93.01; 379/201; 370/254
[58] Field of Search .............................. 379/93.01–93.02, 379/93.05–93.08, 93.14, 93.17, 93.25, 93.28–93.34, 201; 370/254, 389

[56]  References Cited

U.S. PATENT DOCUMENTS

| | | |
|---|---|---|
| 4,893,248 | 1/1990 | Pitts et al. . |
| 4,972,183 | 11/1990 | Kuhlmann et al. . |
| 4,982,430 | 1/1991 | Frezza et al. . |
| 4,987,486 | 1/1991 | Johnson et al. .......................... 348/10 |
| 5,109,484 | 4/1992 | Hughes et al. . |
| 5,146,568 | 9/1992 | Flaherty et al. . |
| 5,261,114 | 11/1993 | Raasch et al. . |
| 5,321,840 | 6/1994 | Ahlin et al. .............................. 395/712 |
| 5,404,527 | 4/1995 | Irwin et al. . |
| 5,406,403 | 4/1995 | Griffin et al. ........................... 359/135 |
| 5,483,585 | 1/1996 | Parker et al. ............................. 379/93 |
| 5,528,490 | 6/1996 | Hill . |

*Primary Examiner*—Wing F. Chan
*Attorney, Agent, or Firm*—Welsh & Katz, Ltd.

[57]  ABSTRACT

An automatic software update system (10) includes a first computer (12) at a first site and a second computer (14) at a second site remote from the first site. The first computer (12) includes, for example, a modem (16) for automatically initiating a dial-up connection with the second computer (14) and suitable programming for automatically providing the second computer with an identification relating to the first computer (12) via the dial-up connection. The second computer (14) also includes, for example, a modem (18) for receiving the identification relating to the first computer (12), and suitable programming for automatically selecting from a database (24) information (28) for the first computer (12) based on the identification. The modem (18) of the second computer (14) is further operable for supplying the selected information (28) to the first computer (12).

14 Claims, 2 Drawing Sheets

AUTOMATIC DIAL-UP SOFTWARE UPDATE SYSTEM

CROSS-REFERENCE TO RELATED APPLICATION

This patent application is a continuation-in-part of U.S. patent application Ser. No. 08/611,394, filed Mar. 6, 1996, abandoned, which is assigned to the assignee of the present application.

TECHNICAL FIELD

The present invention relates generally to systems for updating computer software and, more particularly, to a system wherein one computer provides an update or fix, or a new software version, to another, remotely located computer automatically via a dial-up connection automatically initiated by the remotely located computer.

BACKGROUND OF THE INVENTION

The makers of particular application software for specialized computer systems, such as telephone switching systems or automatic call distributors (ACD's), for example, commonly sell such software to a customer and subsequently supply information, such as software updates or fixes, or even overall software revisions, to the computer of the customer. Generally, application software makers have supplied such updates, fixes, or new software versions to customers on a floppy diskette, which the maker sends to a customer in response to a request from the customer. Upon receiving the diskette, the customer must then manually install the updates, fixes, or new software versions in the customer's computer.

However, the customer may be unaware that it is necessary to update his or her computer system or that an update or fix or a new software version is even available. Even if the customer is aware of the need for, or the availability of, an update, fix, or new software version, and requests such information from the software maker or vendor, the supplying of information to the customer via diskettes is slow and inconvenient and, again, requires manual installation by the customer, which is undesirable.

SUMMARY OF THE INVENTION

A principal feature of the present invention is the provision of an automatic update of software in a computer.

The automatic software update system of the present invention comprises a first computer at a first site (typically, a customer computer) and a second computer at a second site remote from the first site (typically, a computer software maker or distributor). According to one aspect of the invention, the first computer includes connecting means for automatically initiating a dial-up connection with the second computer and identifying means for automatically providing the second computer with an identification relating to the first computer via the dial-up connection. Also according to the invention, the second computer includes communicating means for receiving the identification relating to the first computer, and further includes selecting means for automatically selecting information for the first computer based on the identification. The communicating means of the second computer is further operable for supplying to the first computer the selected information (i.e., the information selected for the first computer by the selecting means of the second computer).

In one embodiment, the connecting means of the first computer comprises a modem. Similarly, the communicating means of the second computer may also comprise a modem. Of course, any other suitable alternative means may be provided for automatically establishing a dial-up connection between the first and second computers and/or for transferring an identification or selected information between the first computer and the second computer. For example, the second computer could receive the identification relating to the first computer via the dial-up connection and yet send the selected information to the first computer via satellite transmission, if desired.

Regardless of the mode of transmission, the selected information sent to the first computer by the second computer preferably comprises either an update or a fix for software of the first computer.

In accordance with one application of the present invention, the first site (where the first computer is located) may be the site of a customer of a software maker or vendor that operates the second computer at the remotely located second site. In such an application, the identification relating to the first computer comprises an identification of particular software of the first computer for which fixes or updates are provided by the vendor.

In operation of the automatic software update system of the present invention, the first computer automatically initiates a dial-up connection to the second computer and automatically provides the second computer with an identification relating to the first computer, such as during initial start-up of the first computer. The second computer then automatically selects information for the first computer from a database of the second computer based on the identification and automatically supplies the selected information to the first computer.

In one embodiment, the first computer retains the selected information received from the second computer in a storage (e.g., a memory or other storage device) of the first computer for access by the customer via the first computer.

In a preferred embodiment, the first computer has a display and means for displaying the selected information received from the second computer on the display.

A feature of the present invention is that the first computer automatically requests information from the second computer.

Another feature of the present invention is that the second computer automatically supplies the information to the first computer.

Still another feature is that the update of software in the first computer is supplied in a simplified and rapid manner.

Further features will become more fully apparent in the following description of embodiments of the invention, and from the appended claims.

DESCRIPTION OF THE PREFERRED EMBODIMENTS

Figure 1:
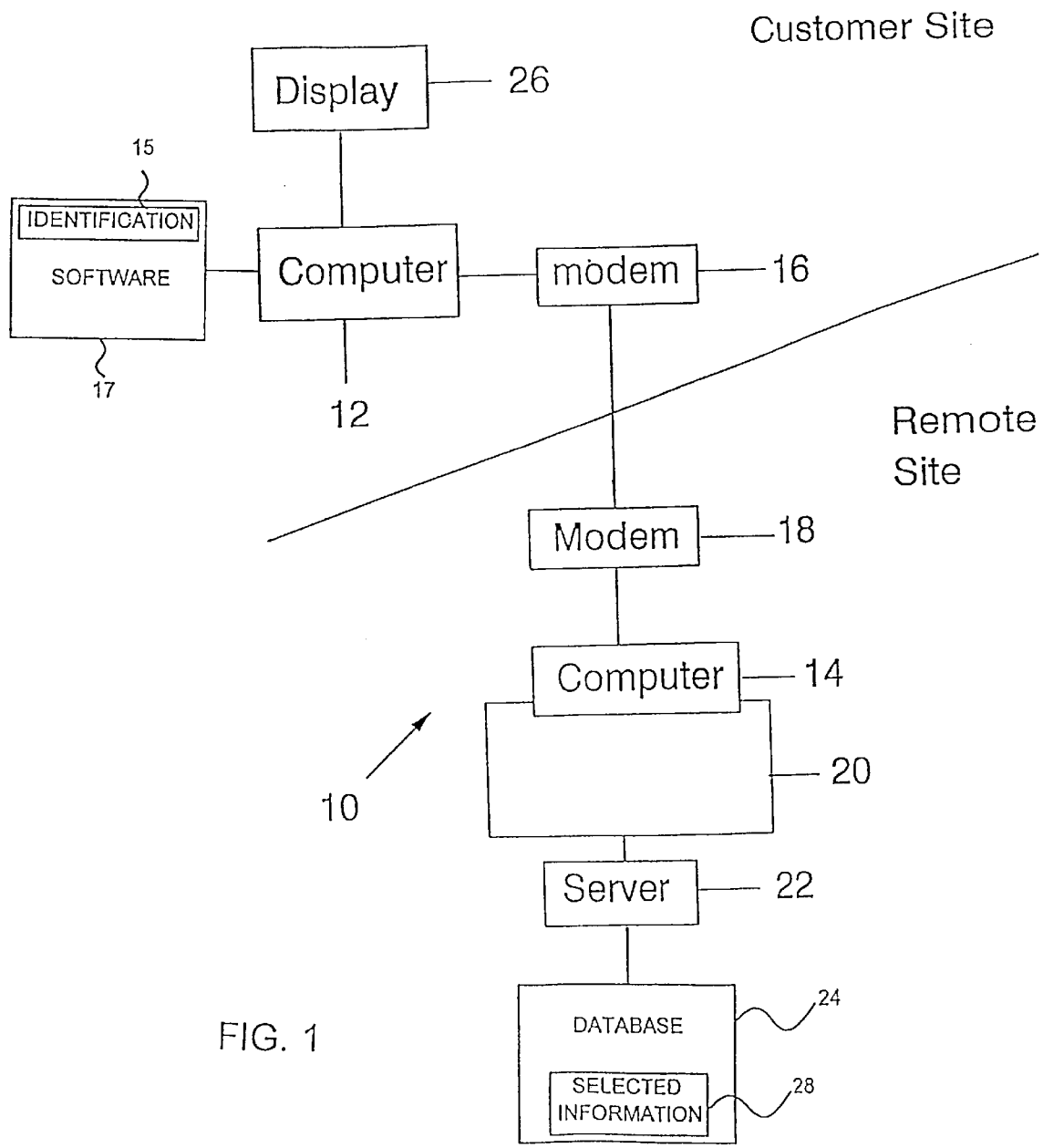
FIG. 1 is a block diagram of an automatic software update system according to the present invention.

FIG. 1 illustrates an automatic software update system 10 in accordance with the present invention. As shown, the automatic software update system 10 includes a first computer 12 located at a first site, such as the site of a customer, and a second computer 14 located at a second site remote from the first site, such as the site of a maker (or a vendor or distributor) of software used at the first computer 12 (or the maker, vendor, or distributor of updates or fixes for software used at the first computer 12). Of course, the system 10 of the present invention can provide for automatic updates of any type of software, but one preferred application for the system 10 is the provision of automatic updates for software components of a telephone switching system, such as an automatic call distribution (ACD) system, operated via the first computer 12. The second computer 14 has suitable software for, and the capability of, being interconnected with the first computer 12, such as via a dial-up connection.

As shown, the first computer 12 has a first modem 16 for transmitting information from the first computer 12 to a second modem 18 of the second computer 14, thus transferring the information from the first computer 12 to the second computer 14. The second computer 14 is connected to a local area network (LAN) 20, which, in turn, is connected to a network server 22 on the LAN 20. The network server 22 has a database 24 from which information can be retrieved by the second computer 14 via the network server 22.

It is desirable for software of the first computer 12 to be provided with updates and fixes by the maker of the software. In accordance with the present invention, therefore, the first computer 12 automatically dials the second computer 14 to obtain such updates or fixes. In particular, the modem 16 of the first computer 12 is commanded by the first computer 12 to initiate a dial-up connection with the second computer 14 via the modem 18 thereof. Once such a dial-up connection has been initiated by the first computer 12, the first computer 12 executes suitable programming to automatically provide the second computer 14 with an identification 15 relating to the first computer 12. For example, the identification relating to the first computer 12 can comprise an identification 15 of the product and currently stored version of particular software 17 of the first computer 12 for which the first computer 12 seeks to obtain any available updates or fixes from the second computer 14. More particularly, the identification may contain the latest revision, update, or fix that the first computer 12 has already obtained from the second computer 14.

Alternatively, the identification 15 may simply be a unique identifier of a CPU of the first computer 12. Upon receipt of such an identifier of the CPU of the first computer 12, the second computer 14 may access a database 24, as described below, to determine the latest software downloaded to the first computer 12.

Still further, the identification 15 may comprise an error file of the first computer 12, which the second computer 14 can use to determine the status of operability of the first computer 12 and determine what upgrades or fixes are needed by the first computer 12. For example, if the first computer 12 has been experiencing RAM errors, the information 28 selected by the second computer 14 for the first computer 12 could comprise a "virtual memory" utility that could be used by the first computer 12 as a means to obviate the RAM errors. More generally, the identification 15 relating to the first computer 12 can comprise a configuration file which the second computer 14 can use to identify the hardware connected to the first computer 12 and the settings of that hardware. This configuration information of the first computer 12 can then be used by the second computer 14 in evaluating the needs of the first computer 12 for available software and selecting suitable information 28 for the first computer 12 in accordance with the actual configuration thereof.

In any event, via the dial-up connection between the modem 16 of the first computer 12 and the modem 18 of the second computer 14, the second computer 14 receives the identification relating to the first computer 12 and thereafter, through suitable programming, automatically selects from the database 24 of the network server 22 information 28 for the first computer 12 based on the identification. In particular, the information 28 selected by the second computer 14 for the first computer 12 preferably comprises an update or a fix for the software 17 of the first computer 12, or alternatively an entire new version of particular software 17 of the first computer 12.

Updates and/or fixes for numerous software products (and numerous revisions of each) may be stored in the database 24, and different customers' computers 12 may require different updates and/or fixes (i.e., different information 28) at any given time. Thus, the second computer 14 selects whatever update or fix or other information 28 is appropriate for the software 17 of the first computer 12 based on the identification 15 that the first computer 12 provides to the second computer 14. If desired, the identification 15 relating to the first computer 12 may include a customer account number and password in addition to whatever information is needed by the second computer 14 to select information 28 that is appropriate for the particular software product 17 in the first computer 12.

Thus, in operation of the automatic software update system 10 of the present invention, the first computer 12 substantially requests information from the second computer 14 concerning the updates and fixes that may be available or desirable to supplement the software 17 in the first computer 12. In turn, the second computer 14 searches the database 24 and selects therefrom the information 28 needed by the first computer 12 and supplies the selected information 28 to the first computer 12, thus automatically updating the software of the first computer 12 with the selected information 28.

Preferably, the second computer 14 sends the first computer 12 a notification regarding the information 28 that the second computer 14 provided to the first computer 12. The first computer 12 preferably retains this notification in a separate log file that may be accessed by personnel operating the first computer 12. In addition, the notification regarding the information 28 supplied by the second computer 14 may also be provided to the user of the first computer 12 via a suitable display 26 thereof.

Thus, in accordance with the present invention, information 28 such as updates and fixes is automatically requested from the second computer 14 during initial start-up of the first computer 12 (or during start-up of particular software 17 of the first computer 12). The requested information 28 is then automatically supplied to the first computer 12 by the second computer 14, whether or not the user of the first computer 12 is even aware that additional information 28 (e.g., a software upgrade or fix) is needed by the first computer 12 or is even available. Consequently, the present invention simplifies the manner in which software updates and fixes are supplied to the first computer 12.

Figure 2:
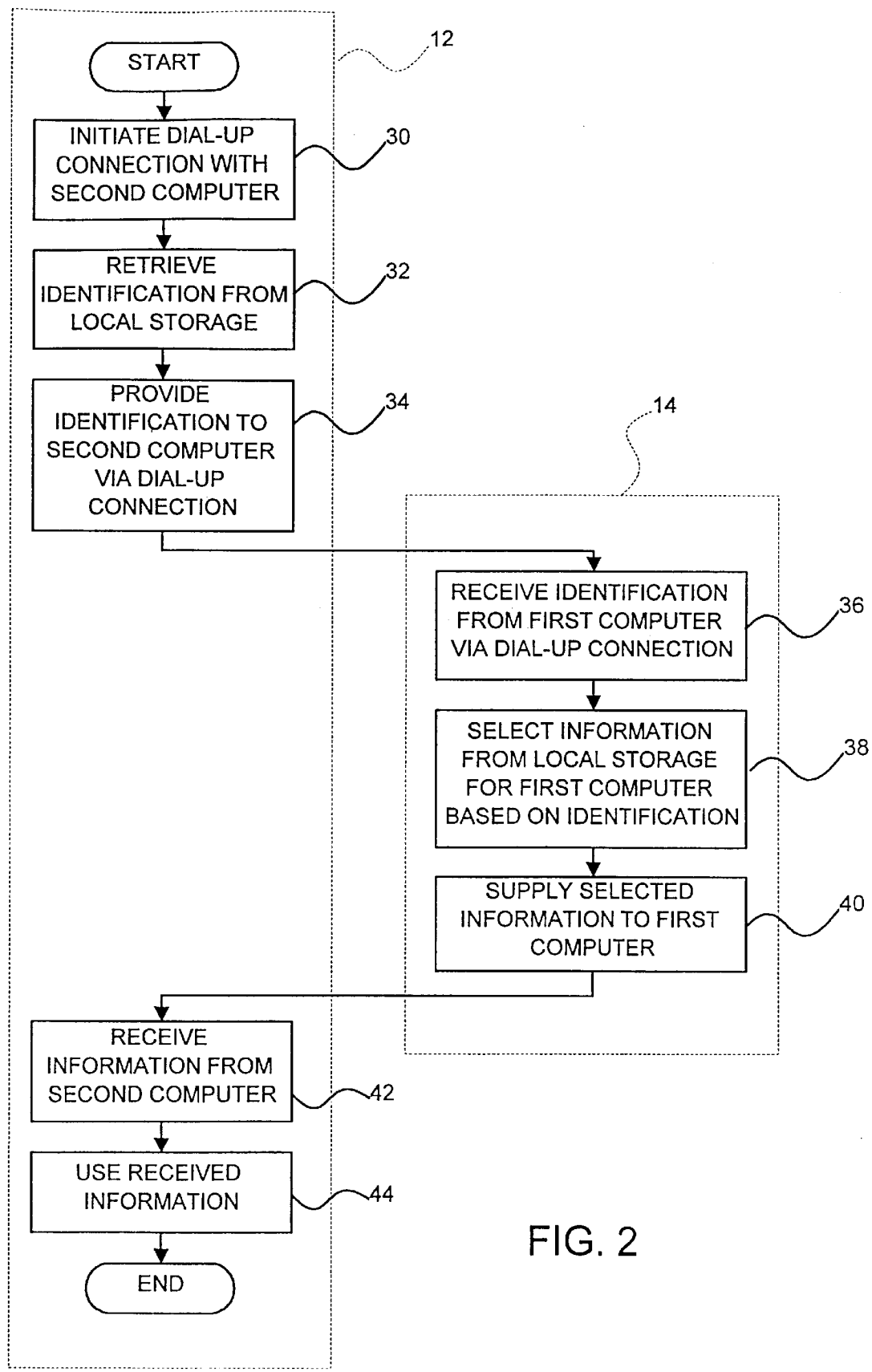
FIG. 2 is a flowchart illustrating programming executed by the first and second computers of FIG. 1 according to the present invention.

The flowchart of FIG. 2 illustrates programming executed by the first and second computers 12 and 14 of FIG. 1 in accordance with the automatic software update system 10 (FIG. 1) of the present invention. As shown in FIG. 2, suitable programming associated with a plurality of blocks 30, 32, 34, 42, and 44 is executed in the first computer 12, and additional programming associated with additional blocks 36, 38, and 40 is executed in the second computer 14. When the first computer 12 is started up, or when particular software of the first computer 12 is started up, a first routine 30 initiates a dial-up connection with the second computer 14. A second routine 32 then retrieves from local storage of the first computer 12 an identification relating to the first computer 12, such as an identification of particular software of the first computer 12. A third routine 34 then provides the identification to the second computer 14 via the dial-up connection initiated by the block 30. Execution of programming by the first computer 12 is then suspended temporarily, and the second computer 14 receives the identification 15 from the first computer 12 via the dial-up connection (fourth routine 36). Information for the first computer 12 is then selected from local storage of the second computer 14 based on the identification (fifth routine 38). A sixth routine 40 then supplies the selected information to the first computer 12, which completes the processing required by the second computer 14 in carrying out the present invention.

Another routine 42 of the first computer 12 then receives the information from the second computer 14, and a further 44 implements any desired or appropriate functions for use of the information received from the second computer 14. Execution of programming associated with the present invention then ends, and the control is returned to the processor of the first computer 12.

The foregoing description is for the purpose of teaching those skilled in the art the best mode of carrying out the invention and is to be constructed as illustrative only. Numerous modifications and alternative embodiments of the invention will be apparent to those skilled in the art in view of this description, and the details of the disclosed structure may be varied substantially without departing from the spirit of the invention. Accordingly, the exclusive use of all modifications within the scope of the appended claims is reserved.

What is claimed is:

1. An automatic software update system for updating telephone switching system software, comprising:

a first telephone switching system computer at a first site and a second computer at a second site remote from the first site;

wherein the first telephone switching system computer includes connecting means for automatically initiating a dial-up connection with the second computer and identifying means for automatically providing the second computer with an identification relating to the first telephone switching system computer via the dial-up connection; and wherein the second computer includes communicating means for receiving the identification relating to the first telephone switching system computer, and selecting means for automatically selecting information for the first telephone switching system computer based on the identification, and wherein the communicating means is further operable for supplying the selected information to the first telephone switching system computer.

2. The automatic software update system of claim 1 wherein the connecting means of the first telephone switching system computer comprises a modem.

3. The automatic software update system of claim 1 wherein the communicating means of the second computer comprises a modem.

4. The automatic software update system of claim 3 wherein the communicating means of the second computer supplies the selected information to the first telephone switching system computer via the dial-up connection.

5. The automatic software update system of claim 1 wherein the selected information comprises an update for software of the first telephone switching system computer.

6. The automatic software update system of claim 1 wherein the selected information comprises a fix for software of the first telephone switching system computer.

7. The automatic software update system of claim 1 wherein the first site of the first telephone switching system computer is a customer site.

8. The automatic software update system of claim 1 wherein the identification relating to the first telephone switching system computer comprises an identification of particular software of the first telephone switching system computer.

9. The automatic software update system of claim 1 wherein the first telephone switching system computer automatically initiates a dial-up connection to the second computer and automatically provides to the second computer an identification relating to the first telephone switching system computer during initial start-up of the first telephone switching system computer, and wherein the second computer automatically selects information for the first telephone switching system computer based on the identification and automatically supplies the selected information to the first telephone switching system computer.

10. The automatic software update system of claim 1 wherein the first telephone switching system computer retains the selected information received from the second computer in a storage of the first telephone switching system computer for access by personnel via the first telephone switching system computer.

11. The automatic software update system of claim 1 wherein the first telephone switching system computer has a display and further includes displaying means for displaying the selected information received from the second computer on the display.

12. The automatic software update system of claim 1 wherein the identification relating to the first telephone switching system computer comprises an error file of the first telephone switching system computer.

13. The automatic software update system of claim 1 wherein the identification relating to the first telephone switching system computer comprises a configuration file usable by the second computer to identify the hardware connected to the first telephone switching system computer and the settings of that hardware.

14. The automatic software update system of claim 1 wherein the second computer sends the first telephone switching system computer a notification regarding the information that the second computer provided to the first telephone switching system computer and wherein the first telephone switching system computer retains the notification in a log file accessible via the first telephone switching system computer.

* * * * *